United States Patent
Butler et al.

(10) Patent No.: US 9,033,145 B2
(45) Date of Patent: May 19, 2015

(54) POSTAL MAILER FOR STRESS-SENSITIVE ARTICLES

(75) Inventors: Todd N. Butler, Cincinnati, OH (US); Bryan W. Horn, Cincinnati, OH (US)

(73) Assignee: Butler Leasing Corporation, Hamilton, OH (US)

( * ) Notice: Subject to any disclaimer, the term of this patent is extended or adjusted under 35 U.S.C. 154(b) by 2073 days.

(21) Appl. No.: 10/912,990

(22) Filed: Aug. 6, 2004

(65) Prior Publication Data

US 2004/0256446 A1 Dec. 23, 2004

Related U.S. Application Data

(60) Provisional application No. 60/525,328, filed on Nov. 26, 2003.

(51) Int. Cl.
*B65D 27/06* (2006.01)
*B42D 15/04* (2006.01)
*B42D 5/02* (2006.01)
*B42D 15/08* (2006.01)
*B65D 27/00* (2006.01)
*G11B 33/04* (2006.01)

(52) U.S. Cl.
CPC .............. *B42D 15/045* (2013.01); *B42D 5/025* (2013.01); *B42D 5/026* (2013.01); *B42D 15/08* (2013.01); *B65D 27/00* (2013.01); *G11B 33/0422* (2013.01); *G11B 33/0494* (2013.01)

(58) Field of Classification Search
USPC ........... 206/312, 308.1, 307, 307.1, 313, 445; 229/72
See application file for complete search history.

(56) References Cited

U.S. PATENT DOCUMENTS

| 2,171,702 | A | * | 9/1939 | Jones ............................... 229/72 |
| 3,595,383 | A | * | 7/1971 | Boylan ......................... 206/312 |
| 3,726,471 | A | | 4/1973 | Kalb ............................. 229/92.8 |
| 4,093,117 | A | | 6/1978 | Morse ............................ 229/70 |
| 4,428,526 | A | | 1/1984 | Riley ........................... 229/92.1 |
| 4,487,360 | A | | 12/1984 | Fisher et al. |
| 4,602,736 | A | | 7/1986 | Barr |
| 4,620,630 | A | | 11/1986 | Moss |
| 4,653,639 | A | | 3/1987 | Traynor |
| 4,706,878 | A | | 11/1987 | Lubotta et al. |
| 4,936,769 | A | | 6/1990 | Schoenleber ................ 229/68.1 |
| 5,052,613 | A | | 10/1991 | Lin |
| 5,090,561 | A | | 2/1992 | Spector |
| 5,288,014 | A | | 2/1994 | Meyers et al. |
| 5,353,931 | A | | 10/1994 | Antik ............................. 206/232 |

(Continued)

OTHER PUBLICATIONS

Just Focus—The CD Business Card People, justfocus.com, Oct. 24, 2000, La Verne, California.

(Continued)

*Primary Examiner* — Anthony Stashick
*Assistant Examiner* — Robert Poon
(74) *Attorney, Agent, or Firm* — Wood, Herron & Evans, LLP

(57) ABSTRACT

Protective mailer capable of being processed by postal processing equipment without causing damage to the article held by the mailer. The pocket holding the article inside the mailer is offset relative to one edge, when folded, by a distance sufficient to prevent damage when the mailer is oriented and processed. The mailer may include a resizing flap that, when unfolded and deployed, changes the dimensions of the mailer so that the mailer is processed by the postal processing equipment as a non-letter or flat mailpiece.

17 Claims, 12 Drawing Sheets

(56) References Cited

U.S. PATENT DOCUMENTS

| | | | |
|---|---|---|---|
| 5,396,987 A | 3/1995 | Temple et al. | |
| 5,458,273 A | 10/1995 | Schubert et al. | |
| 5,460,265 A | 10/1995 | Kiolbasa | 206/308.1 |
| 5,487,826 A | 1/1996 | Back et al. | |
| 5,620,097 A | 4/1997 | Timmons, II et al. | 206/521 |
| 5,713,605 A | 2/1998 | Pace et al. | |
| 5,749,463 A | 5/1998 | Collins | 206/308.1 |
| 5,887,780 A * | 3/1999 | Popat et al. | 229/72 |
| 6,016,907 A * | 1/2000 | Dreier | 206/308.1 |
| 6,073,673 A | 6/2000 | Janutta | |
| 6,126,201 A | 10/2000 | Pace et al. | |
| 6,612,484 B2 | 9/2003 | Rawlings et al. | |
| 7,156,288 B2 * | 1/2007 | Liddell | 206/308.1 |
| 7,798,392 B2 | 9/2010 | Potter et al. | |
| 2002/0117410 A1 * | 8/2002 | Butler et al. | 206/312 |
| 2002/0125305 A1 | 9/2002 | Abercrombie | |
| 2003/0000854 A1 | 1/2003 | Jang | |
| 2004/0046010 A1 | 3/2004 | Colvin | |
| 2004/0050919 A1 | 3/2004 | Calonje et al. | |
| 2004/0112789 A1 | 6/2004 | Robinson | |
| 2004/0206808 A1 | 10/2004 | Calonje et al. | |
| 2005/0072694 A1 | 4/2005 | Hodess et al. | |
| 2005/0247769 A1 * | 11/2005 | Potter et al. | 229/305 |

OTHER PUBLICATIONS

USPTO, Notice of Allowance in related U.S. Appl. No. 11/160,496 dated as mailed Oct. 16, 2009.

USPTO, Office Action issued in related U.S. Appl. No. 11/160,496 dated as mailed Mar. 30, 2009.

Office Action issued in related U.S. Appl. No. 12/705,763 dated Oct. 5, 2012.

USPTO, Office Action issued in U.S. Appl. No. 12/705,763 dated Jul. 2, 2013.

* cited by examiner

POSTAL MAILER FOR STRESS-SENSITIVE ARTICLES

CROSS-REFERENCE TO RELATED APPLICATIONS

This application claims the benefit of U.S. Provisional Application No. 60/525,328 filed on Nov. 26, 2003, the disclosure of which is hereby incorporated by reference herein in its entirety.

FIELD OF THE INVENTION

The invention relates to mailers and, in particular, to mailers that are suitable for securing and protecting stress-sensitive or frangible articles for safe processing by automated processing equipment.

BACKGROUND OF THE INVENTION

The constructions of mailpieces and envelopes must conform to specified size and flexiblity requirements. Postal services, like the United States Postal Service, sort large volumes of mail with high-speed automated processing equipment having pairs of vertical moving belts arranged in a network to grip and serially transport individual mailpieces at a speed of up to 40,000 pieces an hour. The moving belts convey the mailpieces, which are oriented vertically, at a linear velocity approaching 500 to 600 feet per minute. Each mailpiece is oriented in a vertical plane such that a three (3) inch edge portion of the mailpiece is gripped between the moving belts. An optical scanner provided adjacent to the moving belts identifies a destination address for each mailpiece. Mailpieces are sorted according to the destination address and routed by the network of moving belts into assorted bins or stackers.

Changes in direction of transported letter mail in automated processing equipment are accommodated by providing a pulley, roller or drum over which the moving belts are trained at the point where the direction change is to occur. For example, if the mailpiece is moving linearly in a horizontal direction and it is desired to effect a directional change to a different horizontal direction, a drum mounted for rotation about a vertical axis is placed at the change-of-direction point in the path of travel of the opposed belts between which the mailpiece is gripped for transport. As the belts move about the rotating drum, the mailpiece travels through a curved path conforming to the drum periphery and emerges traveling between the moving belts in a new horizontal direction.

Breakable, frangible or stress-sensitive articles, such as compact disks or mini-compact disks must be packaged inside a mailer. Letter-size mailers should comply with postal regulations, such as size requirements and address positioning, while protecting the stress-sensitive article from damage during sorting by the automated processing equipment. Moreover, postal regulations would require the mailer to be flexible enough to be bent and routed about the circumference of cylindrical pulleys, rollers and drums of the type used in automated processing systems at locations where directional changes occur in the travel path of the belts.

Conventional mailers would expose stress-sensitive articles to a significant risk of damage as the mailer is bent about the circumference of the cylindrical roller or drum. As the mailer is conveyed about the exterior of the pulley, roller or drum, the stress-sensitive article must curve or bow and will experience a state of tension due to the flexure that can damage or even break the article. Thus, because of this and other significant shortcomings, conventional letter-sized mailers do not adequately safeguard stress-sensitive articles when handled by automated processing equipment of the type used by the United States Postal Service.

If the dimensions of the mailer exceed a maximum dimension (e.g., oversized) as governed by postal regulations or does meet the flexibility requirements for letter sorting equipment, the United States Postal Service does not treat the mailer as a letter. Instead, the mailer is handled as a non-letter or flat by automated equipment that does not require routing about the exterior of a drum. Most mass mailings, however, are of pre-sorted, letter-sized mailers that are less expensive to mail.

Accordingly, there is a need for mailers for articles that can be handled by automated letter-sized processing equipment and that are fully compliant with postal regulations while simultaneously protecting the article from damage during processing.

SUMMARY OF THE INVENTION

The invention provides mailers configured to carry an article such that the mailer can be bent and transported in automated processing equipment with the article lifted out of contact or substantially out of contact with the belts, drums and other components of the processing equipment. In particular, the invention provides mailers for stress-sensitive or frangible articles, which are articles that are readily or easily damaged by stress, configured such that the mailer can be bent and transported in automated processing equipment without causing stress-related damage to the article. The invention also provides mailers for stress-sensitive articles that positions the article such that the belts of the automated processing equipment do not contact the area of the mailer containing the article or, alternatively, does not contact the area of the mailer overlying more than half of the article. The invention further provides mailers for stress-sensitive articles that can ensure damage-free processing by automated processing equipment of the postal service while securing the article during transit from a sender to a recipient.

In accordance with an embodiment of the invention, a mailer includes a blank having a first edge, a second edge, a plurality of panels arranged between the first and second edges, a plurality of first fold lines joining the panels and substantially parallel to the first and second edges, a pocket dimensioned to receive an article, a second fold line substantially parallel to the first fold lines, and an extension flap joined along the first edge by the second fold line with a corresponding one of the panels. The panels have an unfolded condition in which the pocket is accessible, a first folded condition, and a second folded condition. In the first folded condition, the panels are folded along the first fold lines so that the pocket is inaccessible from an exterior of the mailer and the extension flap is folded along the second fold line to contact an adjacent one of the panels. In the second folded condition, the panels are folded along the first fold lines so that the pocket is inaccessible from an exterior of the mailer and the extension flap is unfolded along the second fold line so that the extension flap extends outwardly from the first edge.

In accordance with another embodiment of the invention, a mailer includes a first panel having a first surface and a second panel having a second surface. The first and second panels may be joined along a first fold line. The first and second surfaces are adhesively bonded to define a pocket capable of receiving an article. The first and second panels have a first edge and a second edge opposite the first edge. The pocket is lifted or spaced from the first edge by an amount sufficient to prevent damage to the article when the folded mailer is handled by postal processing equipment. In one embodiment, the first and second surfaces may include corresponding layers of a coadhesive so that contact between the first and second surfaces causes the layers of coadhesive to adhesively bond to one another and thereby define the pocket for the article. In another embodiment, the mailer may be used as an insert that is positioned inside of an envelope before mailing, while lifting the article out of the beltpath and anchoring the article within the envelope as required by the postal service regulations.

The features and objectives of the invention will become more readily apparent from the following Detailed Description taken in conjunction with the accompanying drawings.

BRIEF DESCRIPTION OF THE FIGURES

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Figure 1:
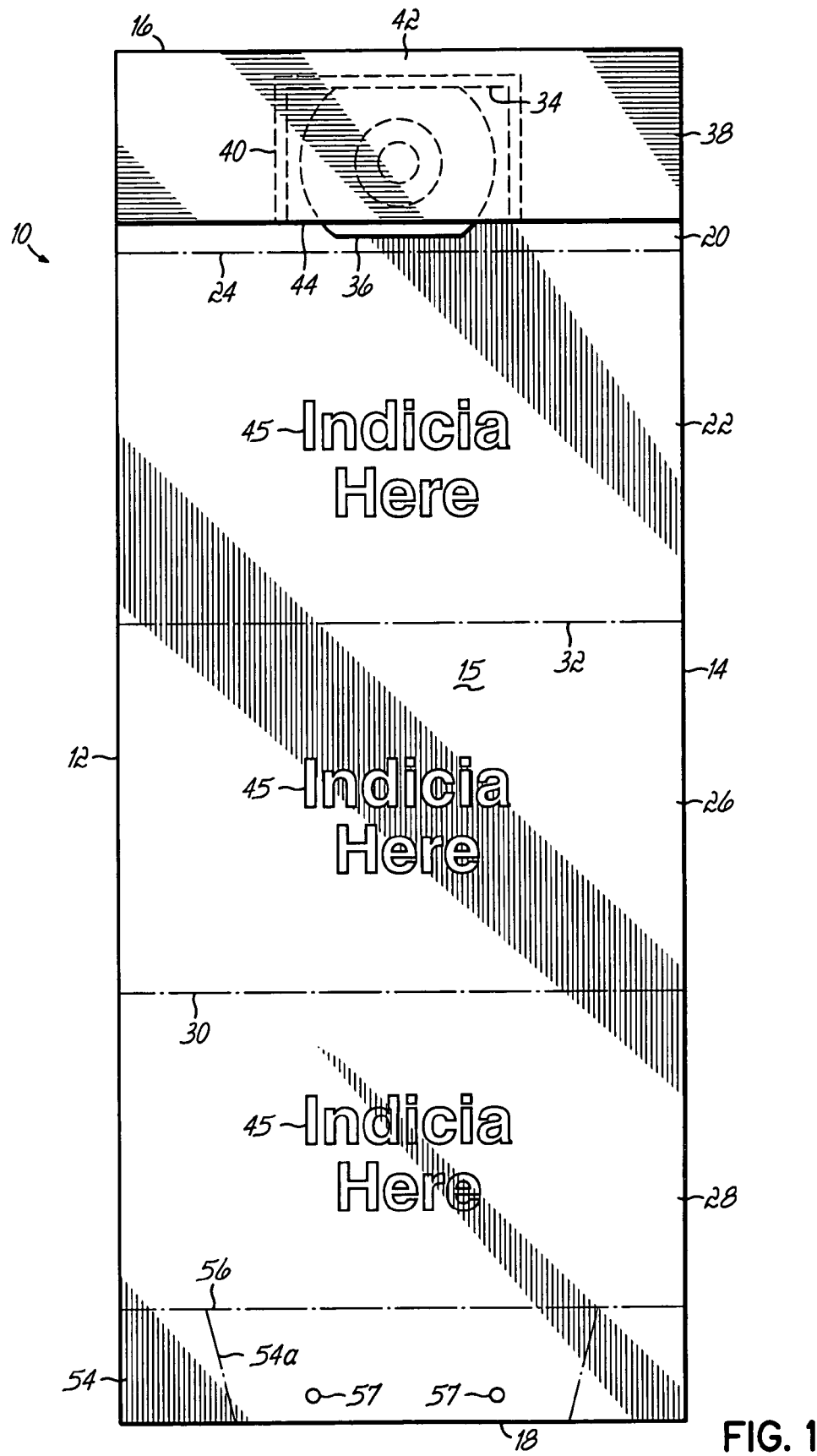
FIG. 1 is a rear view of an embodiment of a mailer in accordance with the invention in an unfolded state.
Figure 3:
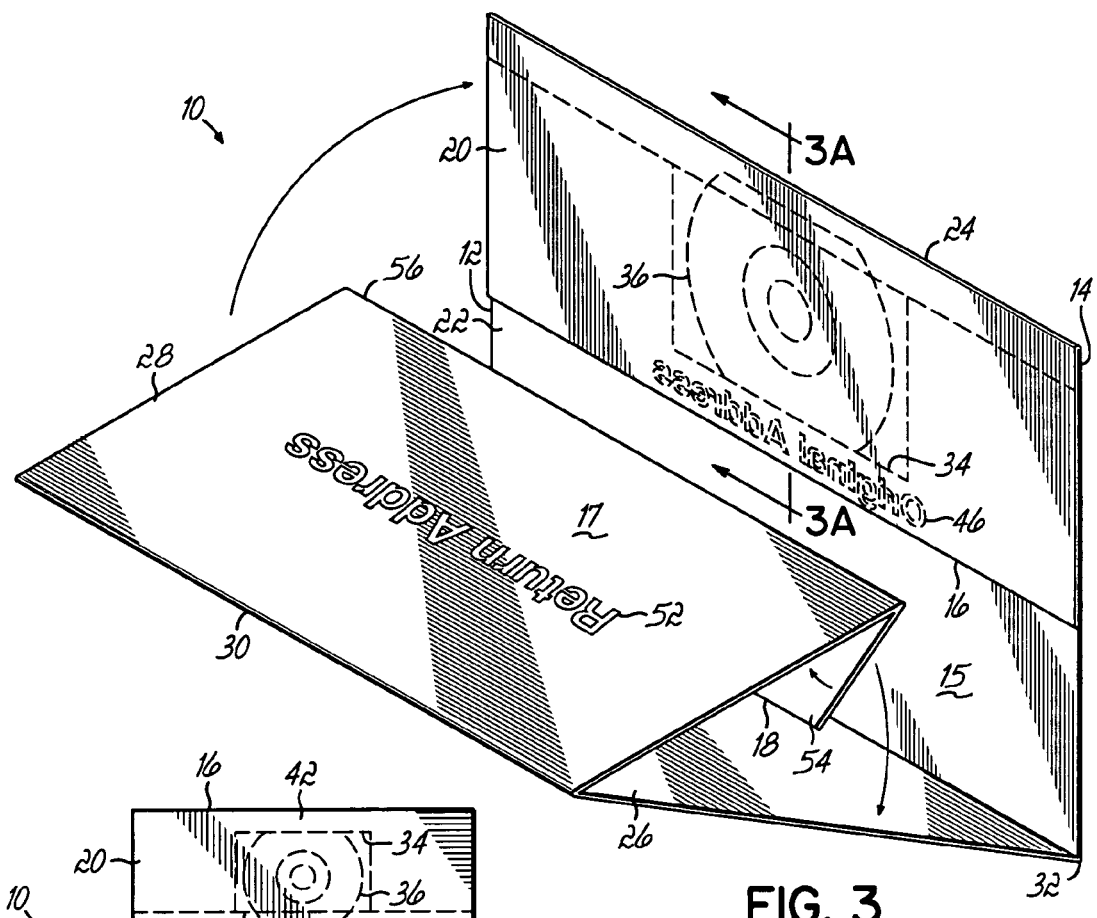
FIG. 3 is a perspective view illustrating the folding of the mailer of FIG. 1 for outbound mailing from a sender to a recipient with the original address visible, the return address hidden, and the resizing flap stowed for original mailing.
Figure 2:
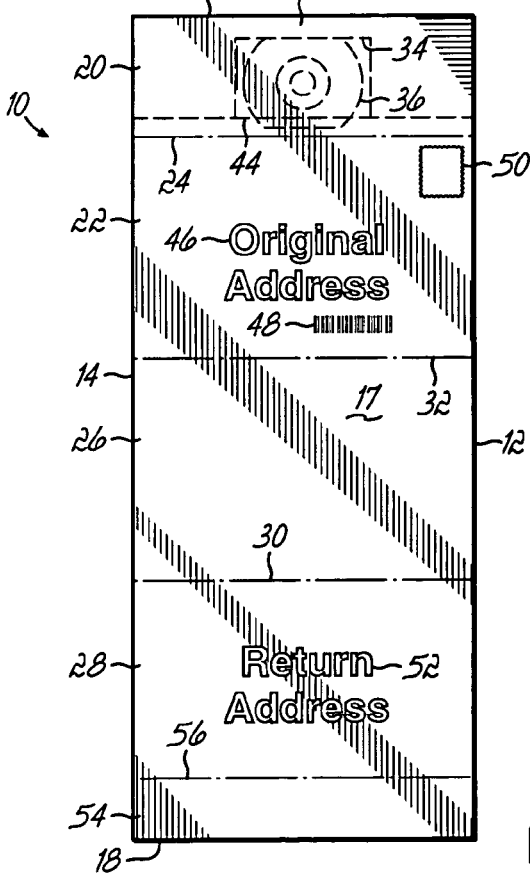
FIG. 2 is a front view of the mailer of FIG. 1.

With reference to FIGS. 1 and 2, a mailer 10 of the invention comprises a generally planar and generally rectangular sheet or blank having opposite side edges 12 and 14, a top edge 16, a bottom edge 18, a rear side 15 visible in FIG. 1, and a front side 17 visible in FIG. 2. Mailer 10 includes a first panel 20, a second panel 22 integrally joined along a transverse fold line 24 extending between side edges 12 and 14 with the first panel 20, a third panel 26, and a fourth panel 28 integrally joined along a transverse fold line 30 extending between side edges 12 and 14 with the third panel 26. The second and third panels 22, 26 are joined along a transverse fold line 32 extending between side edges 12 and 14. The fold lines 24, 30, and 32 are substantially transverse to the top and bottom edges 16, 18 and have a spaced relationship that divides the mailer 10 into panels 20, 22, 26, and 28. The term fold line is used herein to mean a weakened portion of the blank for purposes of folding the blank.

Figure 3A:
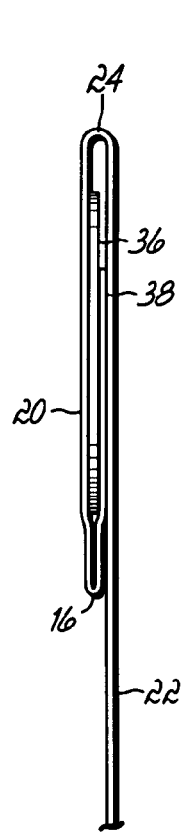
FIG. 3A is a cross-sectional view taken generally along line 3A-3A in FIG. 3.

Fold lines 24, 30, and 32 define lines of weakness along which panels 20, 22, 26, and 28 may be folded. The fold lines 24, 30, and 32 are defined such that panels 20, 22, 26 and 28 have a preferred folding direction. Although not required, the directionality may be provided by appropriately scoring fold lines 24, 30, and 32. The mailer 10 has an open or unfolded position, shown in FIG. 1, wherein the panels 20, 22, 26, and 28 are adjacent to each other in substantially the same plane and a closed or folded position, shown in FIG. 4, wherein the panels 20, 22, 26, and 28 are folded non-accordion style into a more compact configuration suitable for mailing. The invention contemplates that the top edge 16 may constitute another fold line, as shown in FIG. 3A, or may be the non-joined individual free ends of panels 20 and 38.

With continued reference to FIGS. 1 and 2, the mailer 10 includes a pouch or pocket 34 defined near the top edge 16 that is configured to hold and protect an article 36. The pocket 34 is defined as a space between the first panel 20 and a fifth panel 38 by adhesively bonding confronting surface areas of the first and fifth panels 20, 38 with adhesive 40. Panel 38 is adhesively bonded to the rear side 15 of the mailer 10. The adhesive 40 defines lateral boundaries for pocket 34 and an edge boundary connecting the lateral boundaries proximate and substantially parallel to the top edge 16. The adhesive 40 may have many different configurations as understood by persons of ordinary skill in the art, such as adhesive beads, adhesive dots, adhesive blocks or strips, or a thin layer of a coadhesive applied to the panels 20, 38, and is not limited to the illustrated strips.

The distance between the top edge 16 and the edge boundary of pocket 34 defines a false bottom, generally indicated by reference numeral 42, for pocket 34. The pocket 34 includes an opening 44 opposite to the false bottom 42 that is oriented to face substantially toward the fold line 24 and that is dimensioned between the lateral boundaries of pocket 34 to receive the article 36 therethrough for positioning within pocket 34. In certain embodiments contingent upon the size of the article 36, panel 20 is shorter, as measured between top edge 16 and fold line 24, in a direction extending between the top and bottom edges 16 and 18 than panels 22, 26, and 28 as measured between adjacent fold lines. The first and fifth panels 20, 38 may be integral along the top edge 16 and joined along a fold line, as shown, or the fifth panel 38 may be a separate sheet from first panel 20. When the mailer 10 is in a folded condition or state, the pocket 34 and the article 36 are substantially inaccessible from the exterior of the mailer 10 without unsealing and unfolding the mailer 10.

The dimensions of the pocket 34 are predetermined to accommodate the dimensions of the article 36 and, if the article 36 is a magnetic or optical memory storage medium, may be specified to protect the vulnerable storage area of the article 36 from damage. The pocket 34 has a transverse dimension or width that is slightly greater than one dimension of the article 36 and a depth defined by the false bottom 42 that is slightly less than an orthogonal dimension of the article 36. When the article 36 is fully received in pocket 34, the false bottom 42 may permit a portion of the article 36 to be visible when the mailer 10 is in an unfolded condition. However, the extent of the false bottom 42 is chosen to ensure that an upper edge 58a of transport belts 58 (FIGS. 5 and 6) of the postal processing equipment either does not contact any portion of the article 36 or does not contact over half of article 36, depending upon the requirements of the application. The false bottom 42 can be omitted in certain embodiments of the invention, depending upon the dimensions of the article 36, so that the article 36 abuts, or nearly abuts, the top edge 16.

Exemplary articles 36 include stress-sensitive articles formed of a material, such as plastic or a polymer, that is susceptible to damage and more specifically, frangible or breakable plastic articles such as storage media containing information. Common storage media include standard compact disks (CD's) or mini-compact disks (mini-CD's) with at least one information-bearing surface. The storage media may carry audio information and/or video information. A typical CD, which is formed of polycarbonate, has a diameter slightly less than 5 inches (about 12 cm) diameter and a hub extending from a diameter of about 1.5 cm (about 0.6") to about 4.6 cm (1.8"). A typical mini-CD, for example, has a maximum linear dimension of less than about 3.5 inches. The article 36 may also have a construction that is not susceptible to damage when handled by postal processing equipment but nonetheless should be lifted out of the beltpath when processed by postal processing equipment.

Figure 5:
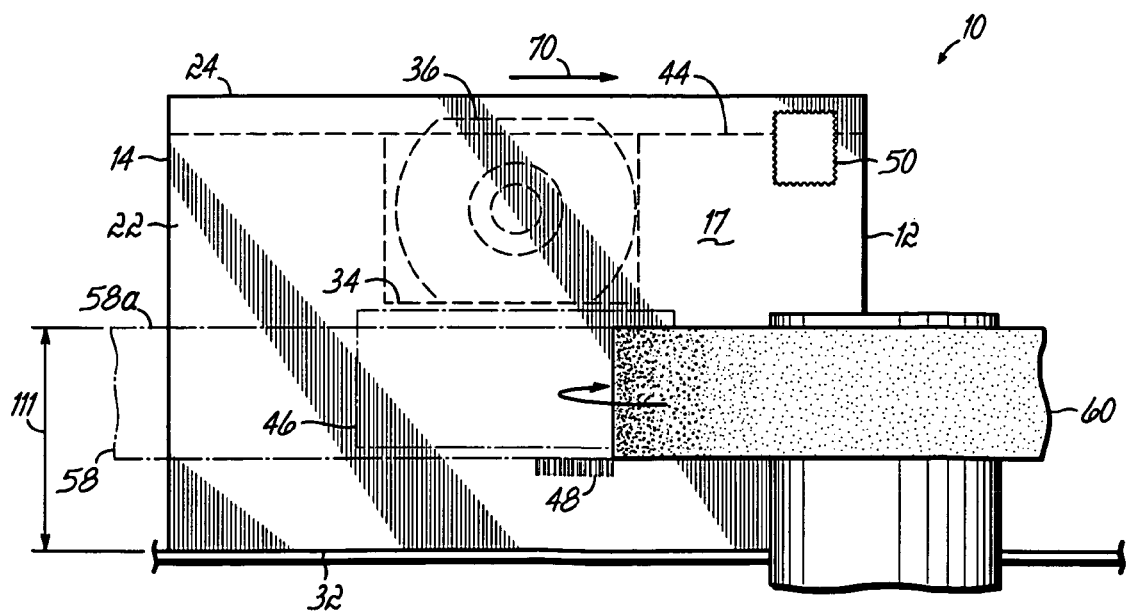
FIG. 5 is a schematic side view illustrating the mailer of the invention being handled by automated processing equipment at a location along the belt path.
Figures 6, 11:
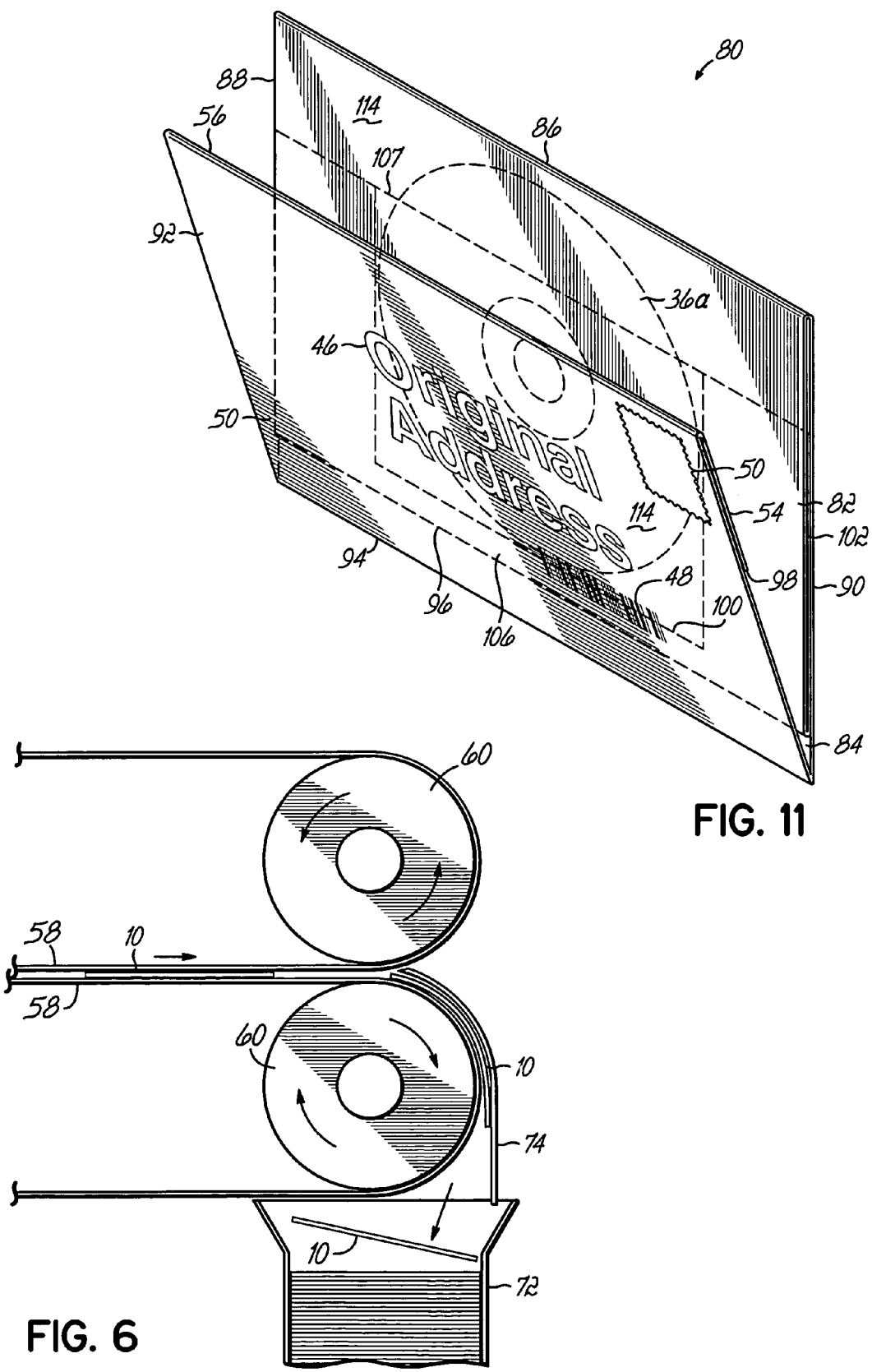
FIG. 6 is a schematic top view of automated processing equipment processing the mailer of the invention at a location near a drum changing the direction of the belt path.
FIG. 11 is a perspective view illustrating the folding of the mailer of FIG. 9 for outbound mailing from a sender to a recipient with the original address visible and the resizing flap stowed for original mailing.

Mailer 10 is constructed to substantially comply with United States Postal Service regulations governing automation-compatible mailpieces. To that end, the mailer 10 height should be between 6.125 inches and 3.5 inches and the mailer 10 length should be between 5 inches and 11.5 inches, wherein length is the dimension parallel to an address 46 when that address 46 is read and the height is the dimension perpendicular to the length. The ratio of length to height, or aspect ratio, should be between 1.3 and 2.5 and a thickness between 0.007 inch and 0.25 inch. Postal regulations require that the mailer 10 and its contents, article 36, an article 36a or another article, bend easily when transported about an 11-inch diameter cylindrical drum 60, as shown in FIGS. 5 and 6.

With reference to FIG. 2, the front side 17 of panel 22 includes an outbound or original address 46, an optional bar code 48, and postage 50. The original address 46 is printed such that address 46 is parallel to the longest folded dimension or length of mailer 10. Mailpieces, such as mailer 10, are usually oriented by postal processing equipment such that the original address 46 of each mailpiece 10 faces a consistent direction and has a consistent vertical orientation. Specifically, the longest dimension or length of the mailer 10 is aligned parallel to the direction of motion, indicated generally by arrow 70 (FIG. 5). The front side 17 of panel 28 may include a return address 52 or may be blank so that a recipient can provide a return address 52 on panel 28. The destination and return addresses 46, 52 are both located on the front side 17 of the mailer 10.

Figure 4A:
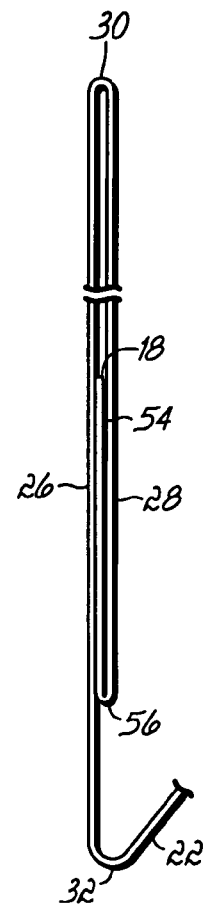
FIG. 4A is a cross-sectional view taken generally along line 4A-4A in FIG. 4.
Figure 4:
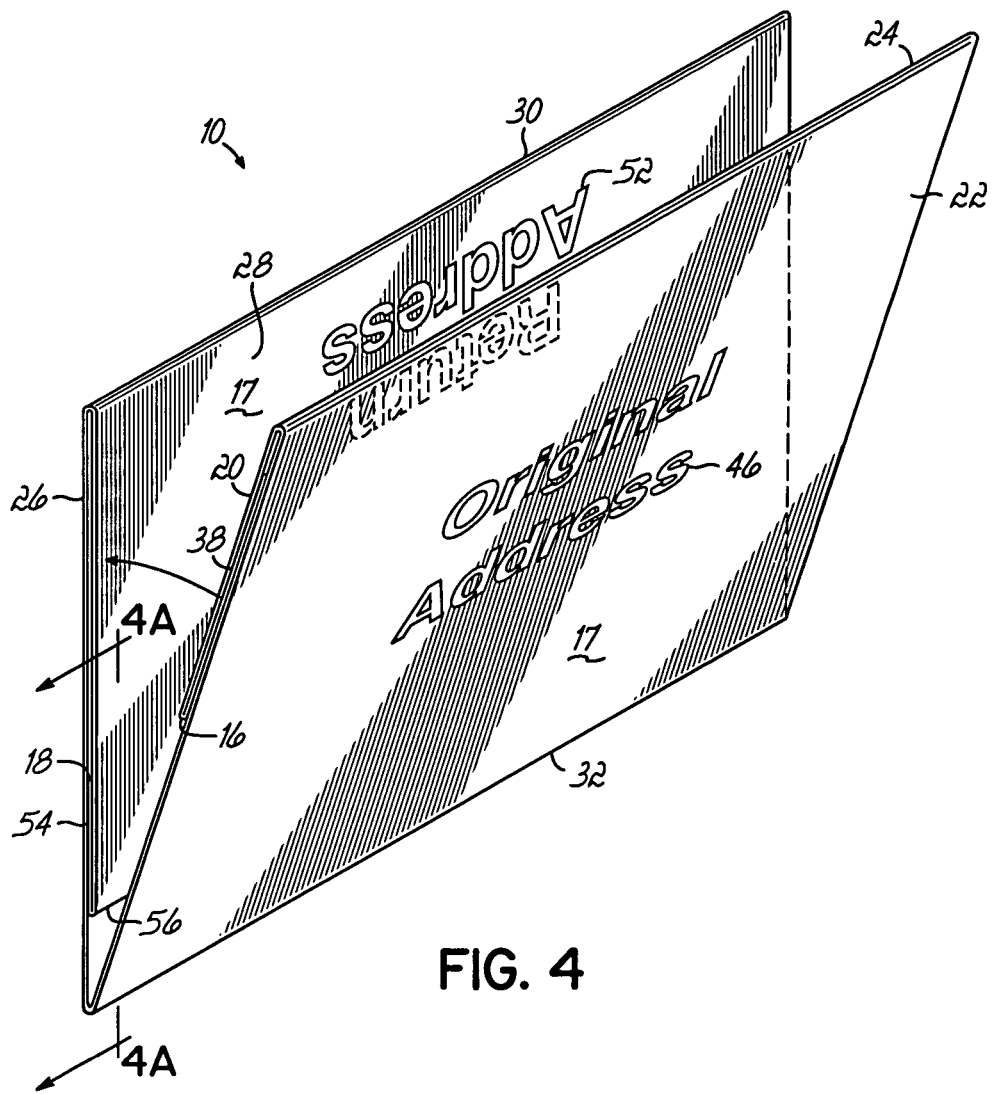
FIG. 4 is a perspective view similar to FIG. 3 illustrating the folding for outgoing dispatch from a sender to a recipient.

With reference to FIGS. 1 and 2, mailer 10 further includes a resizing extension or flap 54 joined along a transverse fold line 56 with the fourth panel 28. The resizing flap 54 is located at an opposite longitudinal end of the mailer 10 from the pocket 34 that receives the article 36. The resizing flap 54 is stowed away inside the mailer 10 in its folded state for dispatch from a source (i.e., sender) at the original address 46 to an intended addressee or recipient. An amount of a low-tack adhesive 57 may be applied to the resizing flap 54 to adhesively secure flap 54 to fourth panel 28 in the stowed position (FIGS. 4 and 4A). In an alternative embodiment, flap 54 may be replaced by a tab-shaped flap 54a (FIG. 1) that has a dimension measured parallel to fold line 56 less than a corresponding dimension of panel 28. The resizing flap 54 may be deployed from the stowed position to a deployed position (FIG. 7) by compromising low-tack adhesive 57, if present, and unfolding along fold line 56 to extend outwardly from the mailer 10, when folded so that return address 52 on panel 28 is visible.

The height of the fourth panel 28, measured between fold lines 30 and 56 may be shorter in height (i.e., the dimension in a direction between the top and bottom ends 16 and 18) than the second and third panels 22, 26. However, the summed height of the fourth panel 28 and the resizing flap 54 is greater than the height of either the first panel 20 or the second panel 22. The resizing flap 54, when deployed, operates to increase the effective height of mailer 10 to provide a non-letter or flat mailpiece. In certain embodiments, the resizing flap 54, when deployed, increases the height of the mailer 10 to exceed 6⅛ inches, which is a current regulatory threshold for classifying mailpieces as letter-sized. However, the invention contemplates that the threshold height is related to prospective regulatory guidance and subject to change. Therefore, in accordance with the invention, the incremental increase in height (i.e., shorter dimension of mailer 10) provided by the resizing flap 54 is a height increase adequate to change the height of the mailer 10 from a height that is letter automation-compatible, when flap 54 is stowed, to a height characterizing flat dimensions under postal regulations, when flap 54 is deployed.

The resizing flap 54 may be constructed to be maintained in the deployed position during processing by the postal service. To that end, the location of the transverse fold line 56 should be configured to provide the requisite stiffness. More specifically, the location of fold line 56 relative to fold line 30 may be selected such that fold line 56 is not proximate to the transverse fold line 32 of the mailer 10 when folded with the resizing flap 54 deployed, although the invention is not so limited. When the fold lines 30, 56 are arranged in this manner, the underlying panel 22 adds support and stiffness to the resizing flap 54. In one specific embodiment, fold line 56 is located one inch from the underlying transverse fold line 32, when the resizing flap 54 is unfolded and the mailer 10 is folded, in a direction toward a transverse fold line 30. In another embodiment, fold line 56 may be approximate aligned with, and overlie, the transverse fold line 32 when the resizing flap 54 deployed.

When the resizing flap 54 is deployed, mailer 10 cannot be handled by letter-sized processing equipment as described herein. Instead, the mailer 10 with the deployed resizing flap 54 is handled by flat processing equipment.

In use and with reference to FIGS. 1-8, the mailer 10 is folded in a non-accordion style (i.e., surfaces of the panels on opposite sides 15, 17 of mailer 10 contact in the folded state, which differs from accordion style folding in which each pair of contacting surfaces is on the same side of the folded item) for mailing to original address 46. With specific reference to FIGS. 3, 3A, 4 and 4A, the article 36 is positioned through the opening 44 (FIG. 1) into pocket 34. The first and second panels 20 and 22 are folded at the fold line 24 such that the article 36 and fifth panel 38 are sandwiched between the first and second panels 20 and 22. The resizing flap 54 is folded along fold line 56 over the fourth panel 28 and the fourth panel 28 is subsequently folded along fold line 30 over the third panel 26 so that flap 54 is captured between the third and fourth panels 26, 28 in the folded state. First and second panels 20 and 22 are then folded along fold line 32 so that the exposed portions of panels 20 and 22 contact the exposed portions of panels 26 and 28 to establish a folded or closed state.

The resizing flap 54 is located in a captured position interposed between the third and fourth panels 26 and 28. In the folded state, the article 36 is sandwiched between the first and second panels 20 and 22 and the article 36 is inaccessible from the exterior of the mailer 10. A sealing member (not shown), such as an adhesive or a tape, is used to secure the mailer 10 in the folded state. When the mailer 10 is in a folded state, the article 36 is inaccessible from the exterior of the mailer 10, protected from damage, and secured from becoming dislodged.

The sender addresses the mailer 10 with at least the original address 46 and optional bar code 48 by any conventional technique, such as labeling, typing or printing. Other information (not shown), such as a Facing Identification Mark (FIM), an indication of the mailer's class, and sender's address, may be provided on the same surface of mailer 10 as the original address 46, optional bar code 48, and postage 50. Typically, a group of mailers 10 is readied for bulk mailing and supplied to the postal service faced and oriented. The mailer 10, in its folded state and sealed, is routed as a letter from the sender to the recipient at the original address 46 via the postal service.

FIGS. 5 and 6 schematically illustrate the processing of mailer 10 as an outbound mailpiece by conventional automated processing equipment comprising moving belts, such as transport belts 58, and rotating drums, such as cylindrical drum 60. The cylindrical drum 60 is used to change the direction of motion of the transport belts 58 and, thereby, to redirect the travel path of mailpieces, such as mailer 10, gripped between the transport belts 58. In such conventional automated processing equipment, transport belt 58 has a width of about 2 inches and the cylindrical drum 60 has a diameter of about 11 inches and a width of about 3 inches. Typically, a pair of transport belts 58 grasp a 2-inch wide height of the opposed parallel faces of each mailpiece, such as mailer 10, and transport the mailer 10 along a travel path for a purpose such as sorting. The transport belts 58 are wound about and driven by the cylindrical drums 60 such that the mailer 10 must traverse a curved path about the circumference of cylindrical drum 60 in that portion of the travel path.

The mailer 10 is oriented vertically according to the location of original address 46 and provided to the transport belts 58 for transport with fold line 32 located between or proximate to belts 58. Fold lines 24 and 30 are furthest from the belts 58. The article 36 or, at the least, the center of the article 36, inside pocket 34 is positioned above the upper edge 58a of the transport belts 58 so that neither of the transport belts 58 can contact the portion of mailer 10 directly overlying more than half of the article 36.

Mailer 10 is bent about the exterior of cylindrical drum 60 to change the direction of the travel path of mailpieces, such as for stacking the mailer 10, along with other mailpieces, in a bin or receiver 72. In the vicinity of the cylindrical drum 60, the mailer 10 is constrained between transport belt 58 and a curved guide rail 74 and subsequently follows a curved path about the outer circumference of the cylindrical drum 60.

Mailer 10 maintains its integrity during transportation and arrives at the recipient with the article 36 intact and undamaged as the article 36 or at least the center of the article 36 is lifted out of contact with transfer belts 58. Because the flexing of the region of the mailer 10 near the pocket 34 is significantly reduced, the risk of damaging or breaking the article 36 is significantly reduced when the mailer 10 moves in a curved path about the outer circumference of the cylindrical drum 60. At the destination, the recipient opens the mailer 10 by compromising the sealing member and unfolding the panels 20, 22, 26 and 28 to the unfolded or open state (FIGS. 1 and 2).

After unfolding, printed indicia 45 carried by the rear side 15 will be visible to the recipient and the article 36 will be accessible for removal by the recipient. Other types of indicia 45, such as foil stamping, die-cut shapes and embossing, may be provided on the rear side 15 or the front side 17 of mailer 10 in addition to printing.

Figure 7:
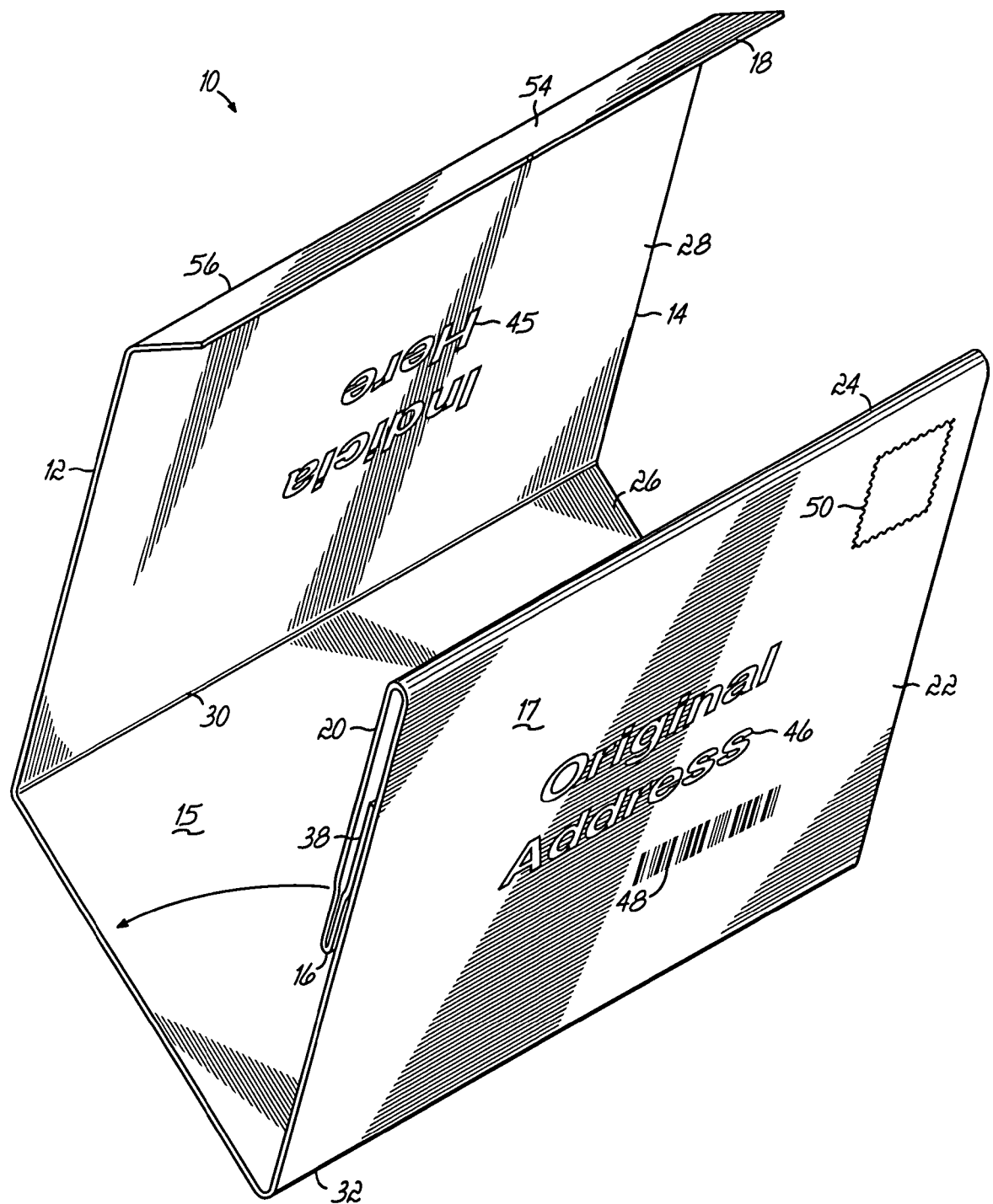
FIG. 7 is a perspective view of the mailer of FIG. 1 shown at a stage of folding for deploying the resizing flap and arranging the mailer panels so that the return address is visible and the original address is hidden.

With reference to FIG. 7, the recipient may insert the article 36 into pocket 34, refold the mailer 10 so that the return address 52 is visible from the exterior of the mailer 10, secure the mailer 10 in the folded condition, and mail the article 36 to a third party, such as the original sender. To that end, the first and second panels 20 and 22 are folded at the fold line 24 such that the article 36 and panel 38 are sandwiched between the first and second panels 20 and 22. The resizing flap 54 is deployed by unfolding along transverse fold line 56 so that resizing flap 54 extends or projects outwardly from panel 28. The first and second panels 20 and 22 are folded to overlie the third panel 26 and then the fourth panel 28 and the extended resizing flap 54 are folded inwardly to cover the original address 46 and thereby, establish the folded or closed state. The mailer 10 is sealed by a selectively-activated adhesive (not shown), such as a moisture-activated adhesive or tape. In the folded state, the return address 52 is visible.

Figure 8:
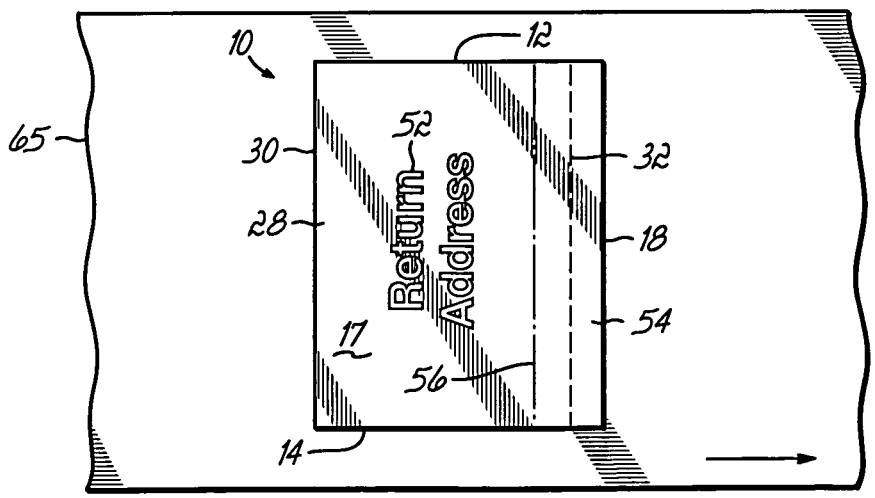
FIG. 8 is a view of the mailer of FIG. 1 being handled by postal equipment designed for non-letter sized mailpieces after the resizing flap is deployed for return mailing.

As illustrated in FIG. 8, the presence of the deployed resizing flap 54 alters (i.e., increases) the height of the mailer 10 so that mailer 10 is no longer within the range of dimensions characterizing a letter and, therefore, is rejected by the facer canceller. The mailer 10, in a closed state and sealed, is routed from the recipient to the postal location indicated by the return address 52 via the postal service. Because of the increased size of the mailer 10, the mailer 10 is rejected by the facer canceller and instead handled as a flat mailpiece. As a result, the mailer 10 is sorted without bending about drums and rollers and is handled as a flat transferred for sorting on a conveyor 65. This increases the probability that the article 36 will arrive intact at the location of the return address 52.

Among the potential applications, the mailer 10 may be used, for example, as a two-way or return mailer for article 36, such as would be useful for return mailing CD's or DVD's back to the original source. The invention contemplates that the mailer 10 may incorporate multiple pockets 34 (FIG. 1) for carrying or transporting multiple stress-sensitive articles 36. Mailer 10 is typically presorted along with multiple other mailers 10 for outbound mailing with the address 46 readable and faced. Because the mailers 10 are presented to the postal service in a presorted group, an automated processing machine, called the facer canceller, is bypassed during outbound mail processing. In orienting mailer 10, the facer canceller processes the mailers 10 both upside down and right side up. When mailer 10 is processed upside down, article 36 is within the beltpath so susceptible to contact by the belts 58. For non-sorted mailpieces, the facer canceller faces (i.e., orients) mailpieces through detection of postage 50 on the mailer 10 so that the address 52 is readable and may cancel the postage 50 with a postmark that shows the post office name and cancelling date.

In transit for return from the recipient to the sender (or another third party), the mailer 10 is typically deposited in a public mail collection site. The mailer 10 and many other commingled mailpieces also deposited at the collection site are randomly oriented as a collection of mixed postal items.

The resizing flap 54 increases the dimensions of the mailer 10 so that the mailer 10 is too large to fit into the feeding mechanism of the facer canceller. As a result, the mailer 10 is not compatible with letter sorting equipment and is culled from the collection of mixed postal items manually or by, for example, the facer canceller itself. The mailer 10 is then handled as a flat mailpiece per postal regulations during the return mailing so that the mailer 10 is not exposed to the belts 58 and drums 60 of automated equipment used to handle letters.

Figure 9:
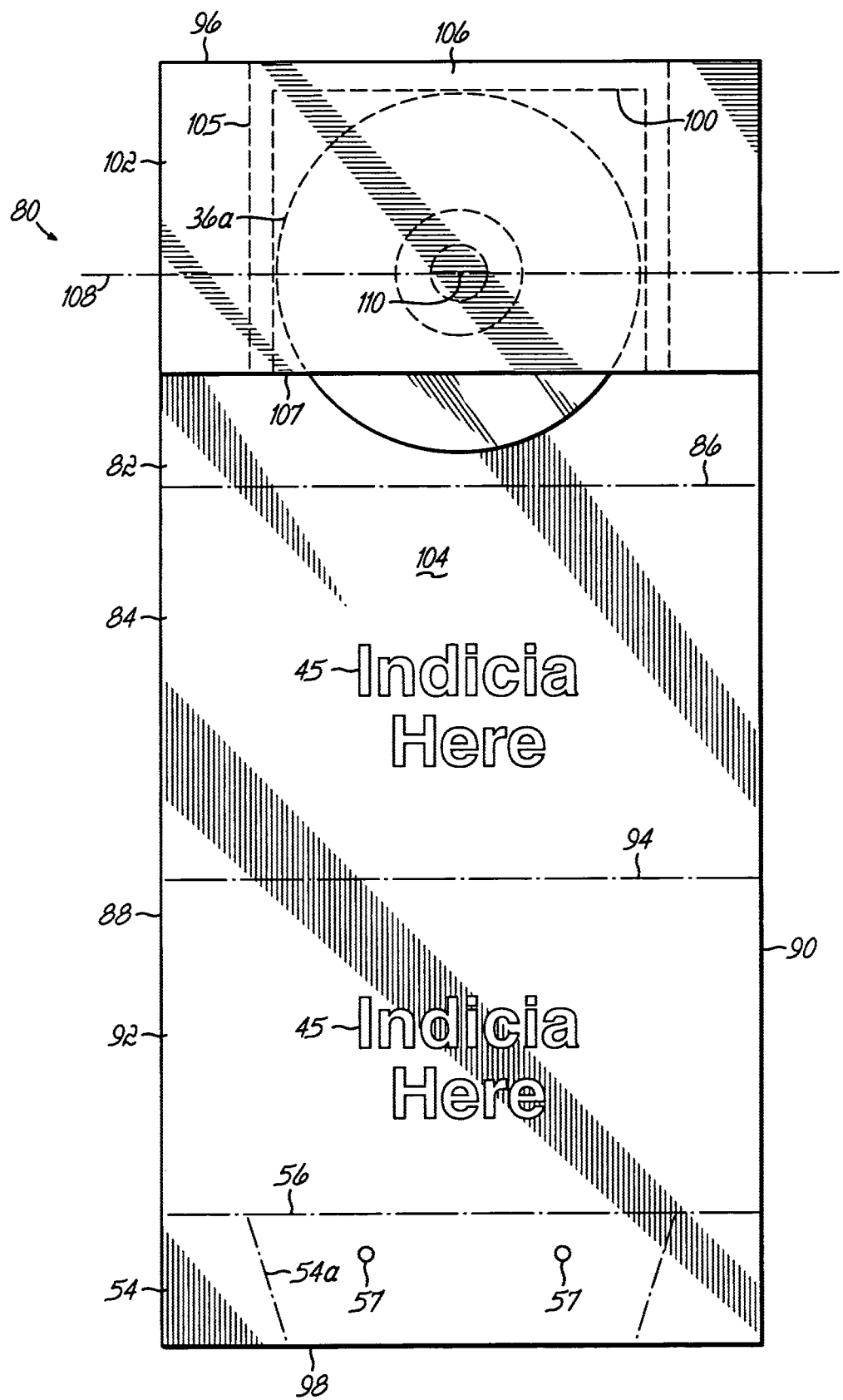
FIG. 9 is a rear view of an embodiment of a mailer in accordance with the invention in an unfolded state.
Figure 10:
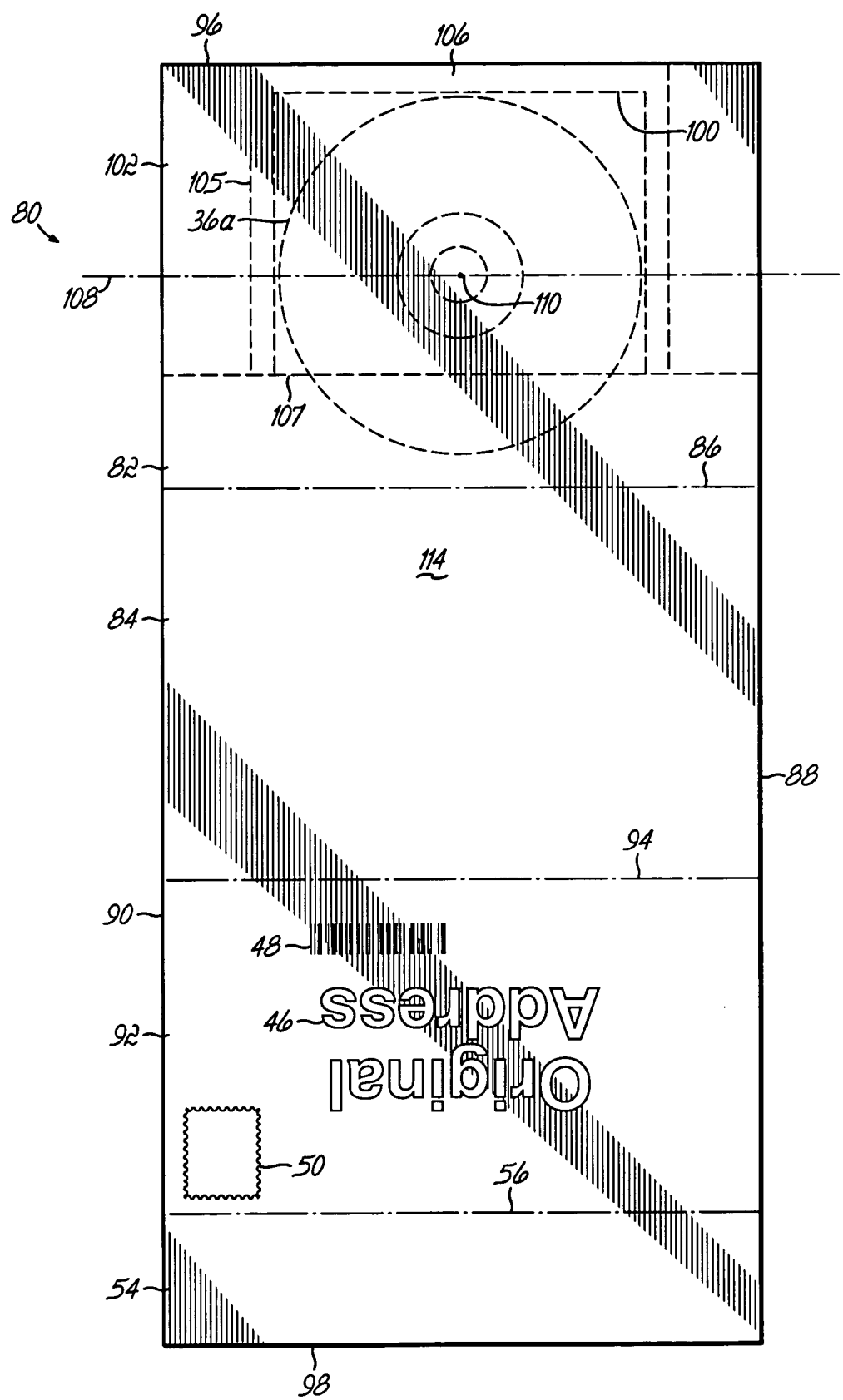
FIG. 10 is a front view of the mailer of FIG. 9.

With reference to FIGS. 9 and 10 in which like reference numerals refer to like features in FIGS. 1-8 and in accordance with an alternative embodiment of the invention, a mailer 80 includes a first panel 82, a second panel 84 integrally joined along a transverse fold line 86 extending between side edges 88 and 90 with the first panel 82, and a third panel 92 integrally joined along a transverse fold line 94 extending between side edges 88 and 90 with the second panel 84. Although the invention is not so limited, mailer 80 includes resizing flap 54, which may be optionally omitted. The fold lines 86 and 94 are substantially parallel to or transverse to the longest or major dimension of mailer 80 and have a spaced relationship to divide the mailer 80 into panels 82, 84 and 92. Panel 82 may be shorter, as measured between a top edge 96 and fold line 86, in a direction extending between the top edge 96 and a bottom edge 98 than panels 84 and 92, as measured between adjacent fold lines.

Mailer 80 includes a pouch or pocket 100, similar to pocket 34 (FIG. 1), defined near the top edge 96 that is configured to hold and protect article 36a, which is similar or identical to article 36. The pocket 100 is defined as a space between the first panel 82 and a fourth panel 102 adhesively bonded to a rear side 104. Specifically, confronting surface areas of the first and fourth panels 82 and 102 are joined by adhesive 105, which defines lateral boundaries for pocket 100 and an edge boundary connecting the lateral boundaries proximate and substantially parallel to the top edge 96. The distance between the top edge 96 and the edge boundary defines a false bottom, generally indicated by reference numeral 106, for pocket 100. The pocket 100 includes an opening 107 opposite to the false bottom 106 that is oriented to face substantially toward the fold line 86 and that is dimensioned between the lateral boundaries of pocket 100 to receive the article 36a therethrough for positioning within pocket 100. The adhesive may have different configurations, such as adhesive dots, adhesive strips, or a layer of coadhesive applied as a pattern to the panels 82 and 102. The first and fourth panels 82 and 102 may be integral along the top edge 96 and joined along a fold line (not shown), or the fourth panel 102 may be a separate piece from the first panel 82. When the mailer 80 is in a folded condition or state, the pocket 100 and the article 36a are inaccessible from the exterior of the mailer 80 without unsealing and unfolding the mailer 80.

The dimensions of the pocket 100 are predetermined to accommodate the dimensions of the article 36a. Accordingly, the pocket 100 has a transverse dimension or width that is slightly greater than one dimension of the article 36a and a depth defined by the false bottom 106 that is slightly less than an orthogonal dimension of the article 36a. When the article 36a is fully received in pocket 100, the false bottom 106 may permit a portion of the article 36a to be visible when the mailer 80 is in an unfolded condition. However, the positioning of the article 36a in pocket 100, including the width of the false bottom 106, is chosen to ensure that the transport belts 58 (FIGS. 5 and 6) of the postal processing equipment do not contact the half of the article 36a above an imaginary line 108 that is substantially parallel to fold line 86 and that intersects a center 110 of article 36a regardless of rotational orientation. In other words, imaginary line 108 is positioned either above or collinear with the upper edge 58a of the transport belts 58. As a result, the pocket 100 is positioned such that only half of article 36a is located between the transport belts 58 during processing. The false bottom 106 can be omitted in certain embodiments of the invention, depending upon the dimensions of the article 36a, so that the article 36a abuts, or nearly abuts, the top edge 96. The mailer 80 includes original address 46, optional bar code 48 and postage 50 on a front side 114 and may also optionally include printed indicia 45 on rear side 104.

With reference to FIG. 11, the mailer 80 is folded in a non-accordion style for mailing to original address 46 by a procedure similar to the procedure illustrated for mailer 10 (FIG. 1). The article 36a is positioned through the opening 107 into pocket 100. The first and second panels 82 and 84 are folded at the fold line 86 such that the article 36a and fourth panel 102 are sandwiched between the first and second panels 82 and 84. The resizing flap 54, if present, is folded along fold line 56 over the third panel 92 and the third panel 92 is subsequently folded along fold line 94 over the first panel 82 so that flap 54 is captured between the first and third panels 82 and 92 to establish a folded or closed state. In the folded state, the original address 46, bar code 48 and postage 50 are visible. When oriented by postal processing equipment, the mailer 80 is consistently oriented according to the original address 46 such that the fold lines 56 and 86 are oriented upward and is positioned above the transport belts 58 (FIG. 5) when captured therebetween. In the folded state, the mailer 80 is used as described above in the context of mailer 10 (FIGS. 1-8).

Figure 12:
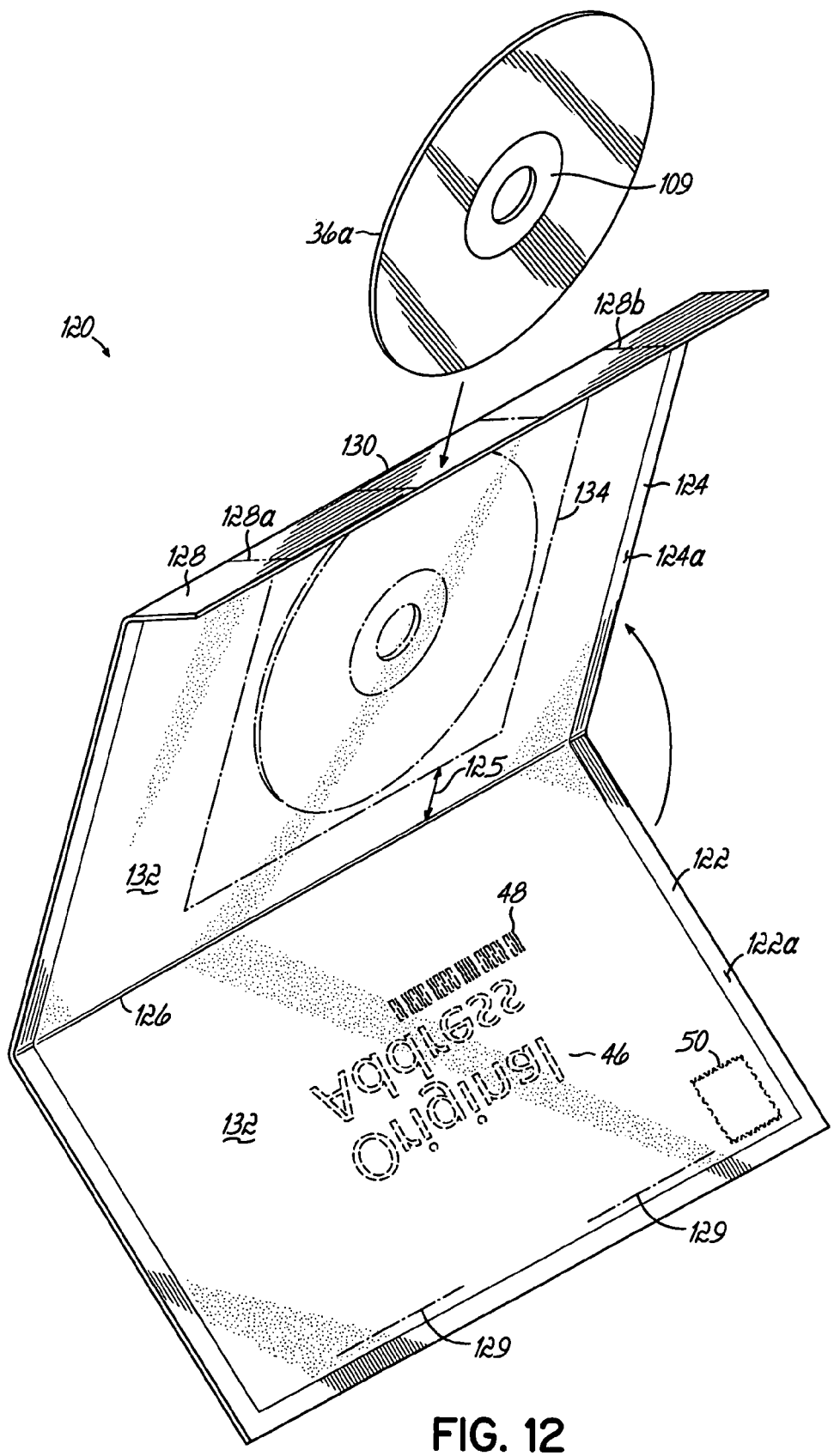
FIG. 12 is a perspective view of a mailer in accordance with an alternative embodiment of the invention.

With reference to FIG. 12 and in accordance with an alternative embodiment of the invention, a mailer 120 is provided that includes a pair of panels 122 and 124 hingeably or foldably joined along a transverse fold line 126 and a smaller optional panel or flap 128 hingeably or foldably joined along a transverse fold line 130 to panel 124. In an alternative embodiment, the fold line 126 may be omitted so that two discrete panels 122, 124 collectively form mailer 120. Adhesive 132 is applied across an inner surface 122a, 124a of panels 122 and 124, respectively, so that the mailer 120 is folded to provide a C-fold configuration, or panels 122, 124 are otherwise joined, with the confronting inner surfaces 122a, 124a in a contacting relationship. The adhesive 132 establishes an adhesive bond between the inner surfaces 122a, 124a that secures the panels 122 and 124 together to prevent unfolding or separation during postal processing and defines the dimensions of a pocket 134 to surround article 36a. Adhesive 132 may be any coadhesive that provides an adhesive bond with itself and, hence, does not adhesively bond with the article 36a when it is pre-positioned between the panels 122 and 124 before folding or joining. After folding or joining, the panels 122 and 124 are on opposite sides of article 36a in a protective spatial relationship, as described above with regard to mailer 10 (FIG. 1) and mailer 80 (FIG. 8). Persons of ordinary skill in the art will appreciate that article 36 (FIG. 1) and other types of stress-sensitive articles (not shown) may be held by the mailer 120, as well as mailers 10 and 80.

A front surface of panels 122, 124, visible when the panels 122, 124 are secured by adhesive 132, bears original address 46, optional bar code 48, postage 50, etc. Flap 128 operates as a sealing flap for mailer 120 and may be provided with adhesive or tape to provide the seal. Alternatively, flap 128 may be omitted if the article 36a is fully concealed between panels 122, 124 or flap 128 may be divided into one or more laterally-spaced tabs 128a, 128b that are received in appropriately positioned optional slits or tab slots 129 defined in panel 122. In one embodiment, the mailer 120 is letter-sized with a height of about 6 inches.

Figure 12A:
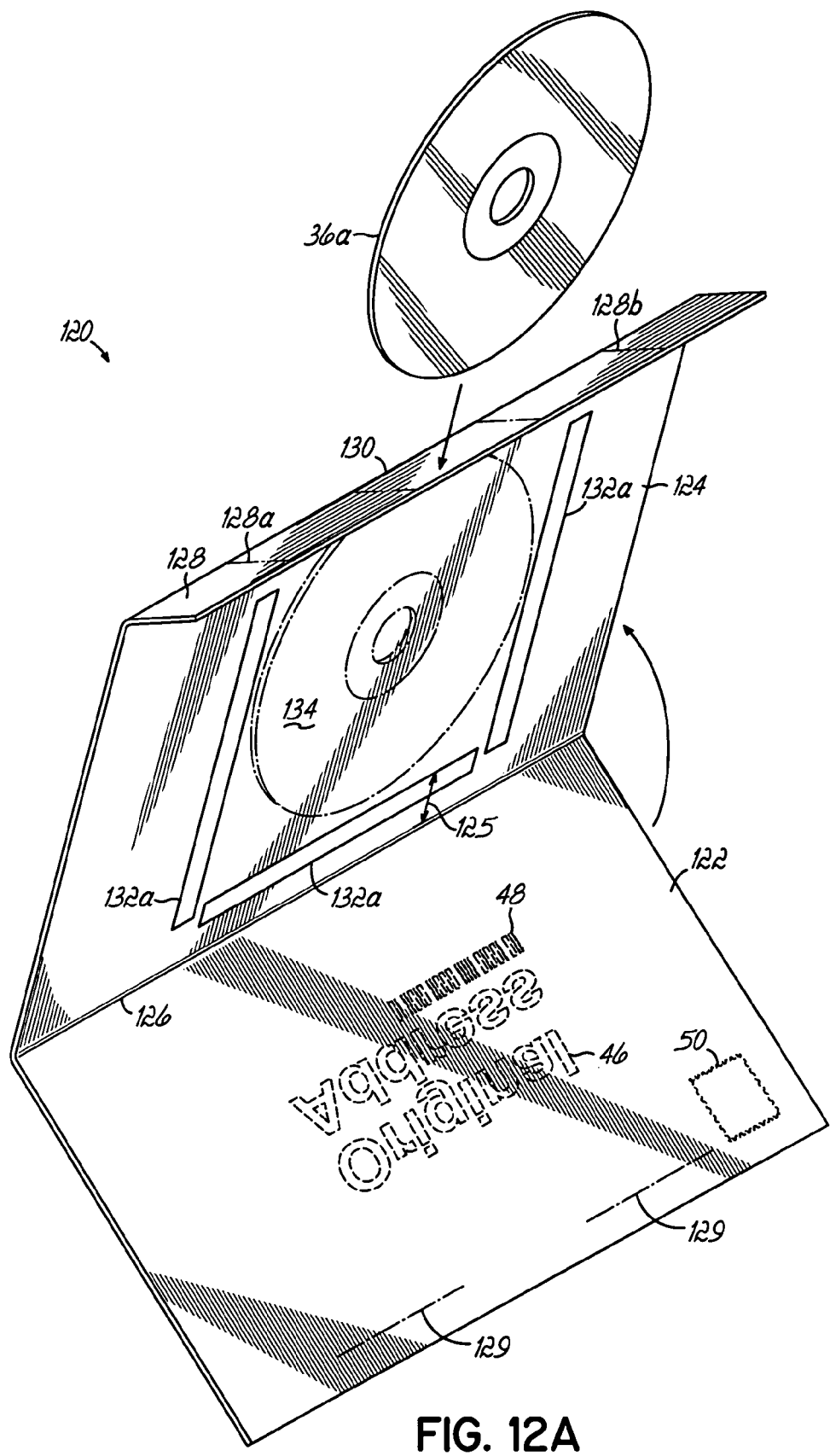
FIG. 12A is a perspective view of an alternative embodiment of the mailer of FIG. 12.

In an alternative embodiment, the adhesive 132 may be applied to the inner surfaces 122a, 124a of panels 122, 124, respectively, in a pattern to define pocket 134. This approach may be applicable if transfer of adhesive 132 to the article 36a is a concern. After pre-positioning the article 36a between the panels 122 and 124 and folding, panels 122 and 124 are still on opposite sides of article 36a in a protective spatial relationship, as described above with regard to mailer 10 (FIG. 1) and mailer 80 (FIG. 8). In yet another alternative embodiment available in conjunction with the definition of pocket 134, article 36a may be inserted into a throat or open end of the pocket 134 defined between the lateral boundaries established by the pattern of adhesive 132 after the panels 122, 124 are folded or joined. Panels 122 and 124 are on opposite sides of article 36a in a protective spatial relationship, as described above with regard to mailer 10 (FIG. 1) and mailer 80 (FIG. 8). As shown in FIG. 12A, pocket 134 may be defined by applying discrete amounts of adhesive, such as strips or blocks of adhesive 132a, to one of the panels 122, 124, for example, panel 124 and folding or otherwise joining panels 122, 124.

With continued reference to FIG. 12, article 36a is positioned relative to the panels 122, 124 such that, when the panels 122, 124 are folded for mailing and oriented for processing with transverse fold line 126 downwardly oriented, at least half of the article 36a will be located or lifted above the upper edge 58a of the transport belts 58 (FIGS. 5 and 6) to insure safe processing of article 36a, as described above with regard to mailers 10 (FIG. 1) and 80 (FIG. 8). In other words, imaginary line 108 (FIG. 9) of article 36a is positioned above the upper edge 58a of transport belts 58 and is therefore positioned above the three (3) inch edge portion 111 (FIG. 5). This lift is provided by adjusting the article location and/or the position of pocket 134 to define a false bottom 125 that separates article 36a from fold line 126. In certain embodiments of the invention, the pocket 134 may be configured to lift a hub 109 of the article 36a out of the beltpath of high-speed automated handling equipment so that the hub 109 is separated from the spine (e.g., the transverse fold line 126 in the folded condition or state) by more than three (3) inches.

The invention contemplates that adhesive 132, although described as a coadhesive, may have any suitable configuration and arrangement for securing article 36a between panels 122 and 124. For example, the adhesive 132 may be suitably-arranged adhesive dots or stripes, as shown in FIG. 12A. The pocket 134 is configured to lift at least half of the article 36a out of the beltpath of high-speed automated processing equipment. It is appreciated that one or more parallel lines or beads of adhesive 132 may be applied in conjunction with one or more spaced dots of adhesive 132 to mailer 120 for purposes of defining the pocket 134.

Although the pocket 134 is depicted as approximately centered along the length of mailer 120 and equidistant from the side edges of the panels 122, 124, the invention contemplates that the pocket 134 may be located at other transverse positions by adjusting the configuration and arrangement of the pattern of adhesive 132. Panels 122, 124 may have equal lengths and heights or may differ in either relative length or relative height. However, the dimensional difference should not relocate the pocket 134 to a position susceptible to damage from high-speed automated processing equipment during transport.

In use and with continued reference to FIG. 12, after the article 36a is positioned relative to the panels 122 and 124 at a location that provides the requisite separation from fold line 126 or, alternatively, article 36a is inserted into the optional pocket 134, panel 124 is folded along fold line 126 into registration with panel 122 or otherwise joined with panel 122 so that adhesive 132 establishes an adhesive bond when pressure is applied. If adhesive 132 is applied in a pattern, the regions on the panels 122, 124 that lack adhesive 132 will be located in registration with one another and surround the article 36a. Flap 128, if present, is folded over panel 122 and sealed. The article 36a held inside mailer 120 is inaccessible from the exterior of the mailer 120, protected from damage, and secured from becoming dislodged against movement inside the mailer 120. In a procedure similar to that described for mailer 10 (FIG. 1), mailer 120, in a closed state and sealed, is routed from the sender to a destination address 46 via the postal service, which typically utilizes automated processing equipment for sorting the mailer 120 according to the destination address 46. The recipient opens the mailer 120 by compromising the adhesive 132 and/or the optional seal provided by flap 128 to gain access to the article 36a.

In certain embodiments, the fold line 130 may be perforated or scored so that flap 128 is removable from mailer 120. The recipient may use the mailer 120 as a protective storage sleeve after receipt. The invention also contemplates that the flap 128 may be used as a resizing flap, as described herein for resizing flap 54 (FIGS. 1, 9). The mailer 120 may be used to return article 36a to the original sender by, for example, covering the address 46 with a return address label, reinserting article 36a into pocket 134, optionally deploying flap 128 as a resizing flap or using flap 128 to seal the mailer 120, and mailing mailer 120. If the flap 128 is deployed as a resizing flap, the mailer 120 should be handled as a flat mailpiece by the postal service.

With reference to FIG. 12A in which like reference numerals refer to like features in FIG. 12 and in accordance with an alternative embodiment of the invention, pocket 134 of the mailer 120 may be defined by discrete amounts of adhesive 132a applied in a pattern that defines three boundaries of the pocket 134. Although illustrated as adhesive strips or blocks, the invention contemplates that adhesive 132 may have the form of adhesive dots or beads. When the panels 122, 124 are folded along fold line 126 and into contact, an adhesive bond is established by adhesive 132a. Article 36a may then be inserted into pocket 134 and flap 128, if present, used to seal the mailer 120.

Figure 12B:
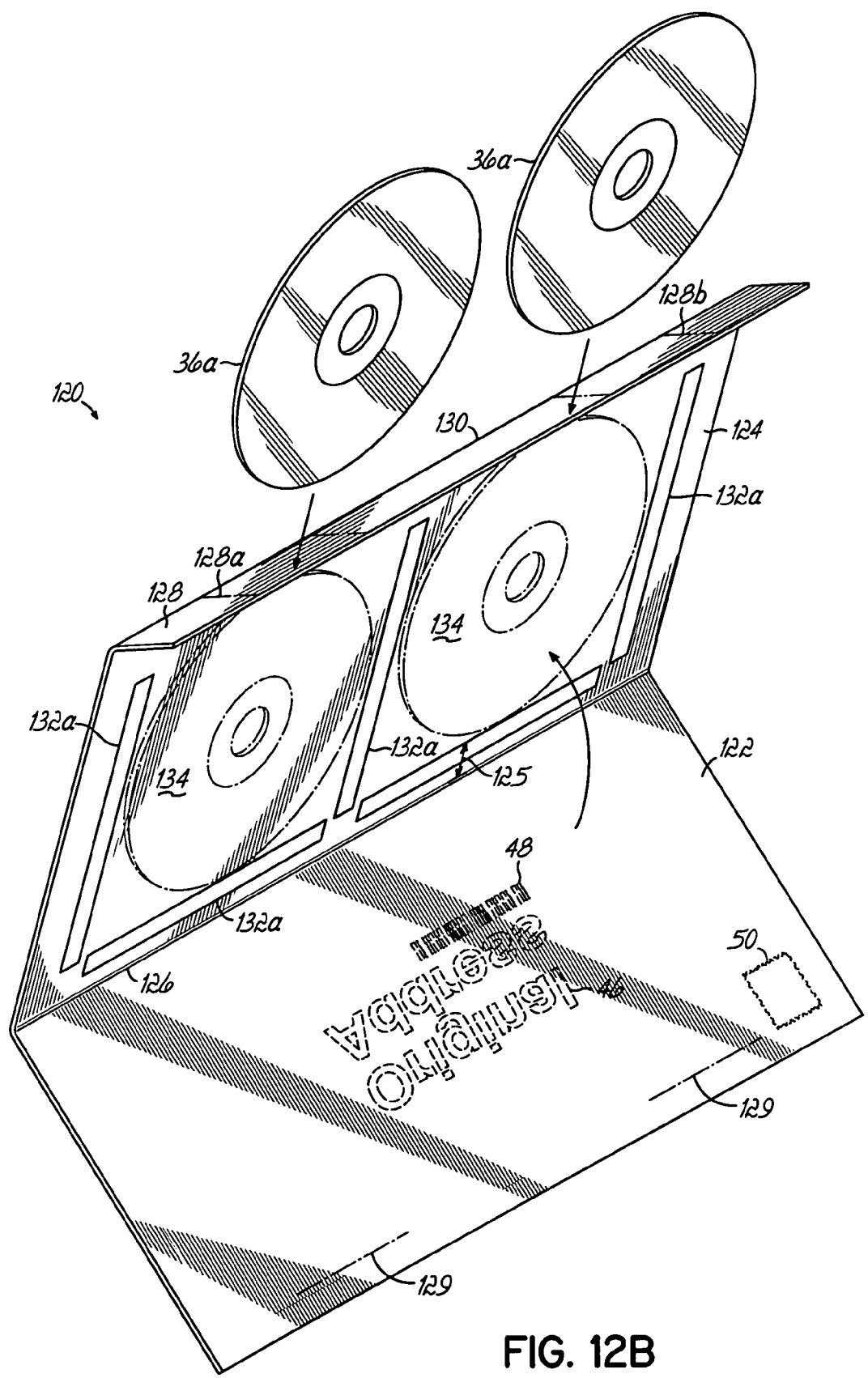
FIG. 12B is a perspective view of an alternative embodiment of the mailer of FIG. 12.

With reference to FIG. 12B in which like reference numerals refer to like features in FIG. 12, the mailer 120 may be provided with two pockets 134a, 134b that are positioned side-by-side between panels 122, 124. Each of the pockets 134a, 134b is dimensioned to receive an article 36a, although the invention is not so limited. The dimensions (height and width) of the mailer 120 is adjusted to accommodate the presence of two pockets 134a, 134b, each of which is separated from fold line 126 by false bottom 125 dimensioned to lift the held articles 36a out of the beltpath of postal processing equipment. Depending upon the size and geometry of the article 36a, it is apparent to persons of ordinary skill that more than two pockets may be defined between the panels 122, 124. The invention contemplates that any embodiment of the mailers 10, 80, 120 described herein may be provided with two or more pockets, similar to pockets 134a, 134b, arranged to provide sufficient lift out of the beltpath of postal processing equipment for each article held within the pockets.

Figure 13:
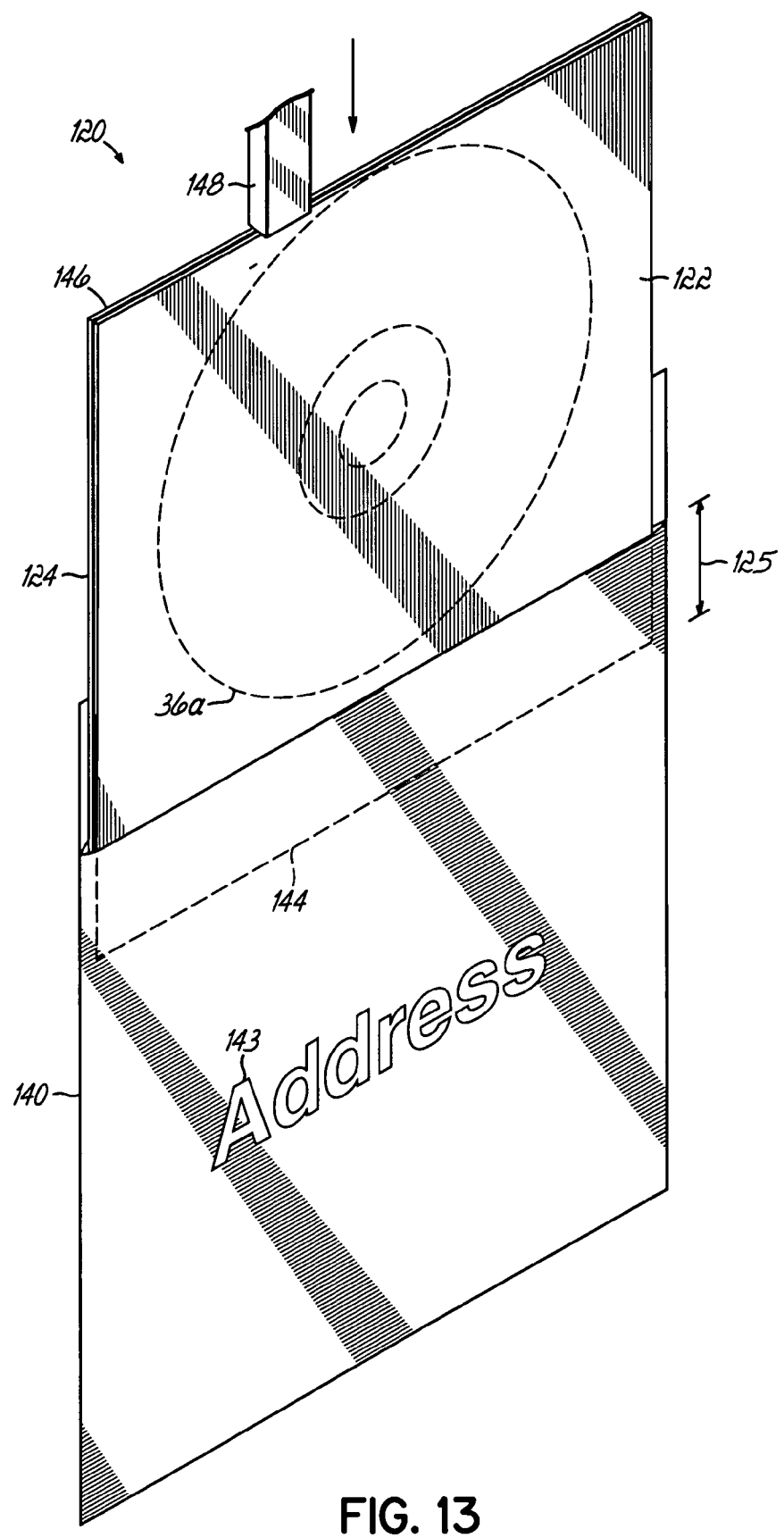
FIG. 13 is a perspective view showing an embodiment of the mailer of FIG. 12 without a closing flap being inserted into a separate envelope for mailing.

With reference to FIG. 13 in which like reference numerals refer to like features in FIG. 12, the embodiment of the mailer 120 lacking a flap 128 may be treated as an insert that is inserted into an envelope 140 bearing an address 143 before mailing. The article 36a is positioned relative to a bottom end 144 of mailer 120 so that a top end 146 of mailer 120 can be pushed into the envelope 140 by a pusher arm 148. The pusher arm 148 pushed the mailer 120 into envelope 140, which is then sealed and mailed. The envelope 120 has an enclosed space dimensioned to fully receive the mailer 120.

The distance from the bottom end 144 to the nearest portion of article 36a is selected by adjusting the location of the adhesive 132 so that the contacting panels 122, 124 of mailer 120 may be clamped or gripped during the insertion process, if necessary for processing mailer 120, by a gripper arm across the false bottom 125 of the mailer 120 defined between bottom edge 144 and the nearest boundary of pocket 134 without contacting the article 36a. This false bottom 125 between bottom edge 144 and the nearest portion of article 36a provides an area for gripping the mailer 120 without damaging the article 36a. Panel 122 or panel 124 may have a shorter height measured between the bottom and top edges 144, 146, respectively, so that a portion of the article 36a is uncovered by the shorter panel and, therefore, exposed and visible.

The location of the address 143 on the envelope 140, the dimensions of the mailer 120 and envelope 140, and the height of the false bottom 125 are chosen such that the article 36a will not be damaged by processing with automated processing equipment, as described herein. Imaginary line 108 (FIG. 9) is positioned either above or collinear with the upper edge 58a of the transport belts 58. As a result, the pocket 100 is positioned such that less than half of article 36a is located between the transport belts 58 (FIGS. 5 and 6) during processing. In various specific embodiments, the mailer 120, when treated as an insert, may be sized to fit inside a standard 6"×9" envelope, a standard 6"×9.5" envelope, a 6"×11.5" envelope, or any other sized envelope. The mailer 120 defines a protective sleeve that maintains the article 36a anchored per postal regulations and that may be inserted into envelope 140 of any size using existing insertion technology. Additional inserts (not shown), such as collateral marketing materials, may be positioned inside envelope 140 and mailed along with mailer 120. The recipient may retain the mailer 120 after receipt and continue to use the mailer 120 as a protective storage sleeve for the article 36a.

The mailers 10, 80 and 120 may be formed from any suitable material, such as plastic, paper stock or cardboard, and may be fabricated from a larger sheet of material by any suitable process, such as die cutting. The material should be stiff enough to withstand processing in automated mail processing equipment without significant damage so as to protect the article 36 or 36a, yet lightweight for purposes of manufacturability and to minimize mailing costs.

While the present invention has been illustrated by the description of embodiments example thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A mailer for an article, the mailer being transported between a pair of moving belts when the mailer is processed by postal processing equipment, and the moving belts having a width, the mailer comprising:

a first panel having a first surface;

a second panel having a second surface in contact with said first surface of said first panel, said second surface being adhesively bonded by portions of an adhesive with said first surface, said second panel having a first edge and a second edge spaced from said first edge by a height of said mailer when said first and second panels are adhesively bonded by said adhesive portions, said first and second edges located on opposite sides of the moving belts when said mailer is transported between the pair of moving belts, said adhesive portions defining a first pocket between said first surface of said first panel and said second surface of said second panel for holding the article, at least one of said adhesive portions positioned between said first edge and said pocket to define a false bottom to limit movement of the article relative to said first edge, said false bottom so dimensioned that at least half of the portions of the first and second panels overlying the article in said first pocket are not contacted over the width of the pair of moving belts, and another of the adhesive portions is positioned to define a side edge of the pocket so as to limit movement in a direction parallel to the first and second edges; and an envelope having an enclosed space, said first and second panels disposed in said enclosed space of said envelope after said first and second panels are adhesively bonded, wherein said first panel is joined to said second panel along a fold line, and said first and second panels are folded along said fold line for adhesively bonding said first and second surfaces.

2. The mailer of claim 1 further comprising:

a flap joined with said first panel by a fold line extending along said second edge, said flap capable of being secured with said second panel for closing said second edge.

3. The mailer of claim 2 wherein said flap is adhesively secured with said second panel.

4. The mailer of claim 2 wherein said flap is a sealing flap, said second panel includes a tab slot, said sealing flap is positioned relative to said first panel for securement inside said tab slot.

5. The mailer of claim 2 wherein said fold line is configured such that said flap is removable from said first panel.

6. The mailer of claim 2 wherein said flap may be unfolded along said fold line so that said flap extends outwardly from said second edge.

7. The mailer of claim 1 wherein said first surface includes a first layer of a coadhesive and said second surface includes a second layer of said coadhesive, said first and second layers of coadhesive providing said adhesive portions and adhesively bonding said first and second surfaces to define said first pocket for the article.

8. The mailer of claim 7 wherein said first layer of said coadhesive is applied to said first surface in a first pattern having a first uncoated area and said second layer of said coadhesive is applied to said second surface in a second pattern having a second uncoated area, said first and second uncoated areas registered with one another to define said first pocket.

9. The mailer of claim 1 wherein said first pocket and said first and second panels are dimensioned to receive an object selected from the group consisting of a mini-compact disk and a standard compact disk.

10. The mailer of claim 1 further comprising a second pocket dimensioned to receive another article, said second pocket spaced from said first edge such that at least half of the article in the second pocket is located outside of the width of the belts when said mailer is processed by the postal processing equipment.

11. The mailer of claim 1 wherein said article is a magnetic memory storage medium or an optical memory storage medium.

12. The mailer of claim 1 wherein said first pocket has an open end configured for passage of the article, said open end of said first pocket being located along said second edge of said first and second panels when adhesively bonded.

13. The mailer of claim 1 wherein said first and second panels have different sizes.

14. The mailer of claim 1 wherein the portions of the first and second panels overlying the article within said first pocket are contacted by the moving belts.

15. The mailer of claim 1 wherein said first pocket is positioned by said at least one of said adhesive portions from said first edge such that at least one of said first and second panels can be gripped along said first edge without contacting the article.

16. The mailer of claim 1 wherein said first pocket has an open end configured for passage of the article.

17. The mailer of claim 16 wherein said fold line is located along said first edge, and said open end is located along said second edge.

\* \* \* \* \*